United States Patent [19]
Abe

[11] Patent Number: 5,642,945
[45] Date of Patent: Jul. 1, 1997

[54] BEARING ASSEMBLY

[75] Inventor: Shinji Abe, Osaka, Japan

[73] Assignee: Koyo Seiko Co., Ltd., Osaka, Japan

[21] Appl. No.: 511,615

[22] Filed: Aug. 4, 1995

[30] Foreign Application Priority Data

Aug. 26, 1994 [JP] Japan .................. 6-225884

[51] Int. Cl.[6] .................. F16C 33/66; F16C 33/38
[52] U.S. Cl. .................. 384/470; 384/528
[58] Field of Search .................. 384/523, 527, 384/528, 531, 533, 470

[56] References Cited

U.S. PATENT DOCUMENTS

| | | | |
|---|---|---|---|
| 3,121,597 | 2/1964 | Moran | 384/528 |
| 3,162,493 | 12/1964 | Hanau | 384/527 |
| 3,832,023 | 8/1974 | Fairbank | 384/527 |
| 4,225,199 | 9/1980 | Earsley | 384/470 |
| 4,226,484 | 10/1980 | Glassow et al. | 384/470 |
| 4,324,444 | 4/1982 | Buczynski et al. | 384/526 |

*Primary Examiner*—Thomas R. Hannon
*Attorney, Agent, or Firm*—Reid & Priest LLP

[57] ABSTRACT

A ball bearing assembly is provided with a ball retainer having a radially extending guide portion that serves to guide the ball retainer relative to either an inner or an outer ring of the ball bearing assembly. The ball retainer is provided with a series of ball pockets with each of the ball pockets having a central cylindrical portion that transitions smoothly into inner and outer portions having spherical configurations. The diameter of the central cylindrical portion is smaller than the diameters of the inner and outer spherical portions. The configurations of the ball pockets ensures that a clearance will be maintained between each of the balls and the edge portions of the ball pockets even when the ball retainer is deflected relative to the inner and outer rings of the ball bearing assembly. The internal configuration of the ball pockets ensures that the amount of lubricant retained within the ball pockets is optimized. The optimization of the amount of lubricant retained within the ball pockets results in a desired level of frictional torque generated by the ball bearing assembly and the elimination of abnormal noises generated during high speed rotation of the ball bearing assembly.

1 Claim, 8 Drawing Sheets

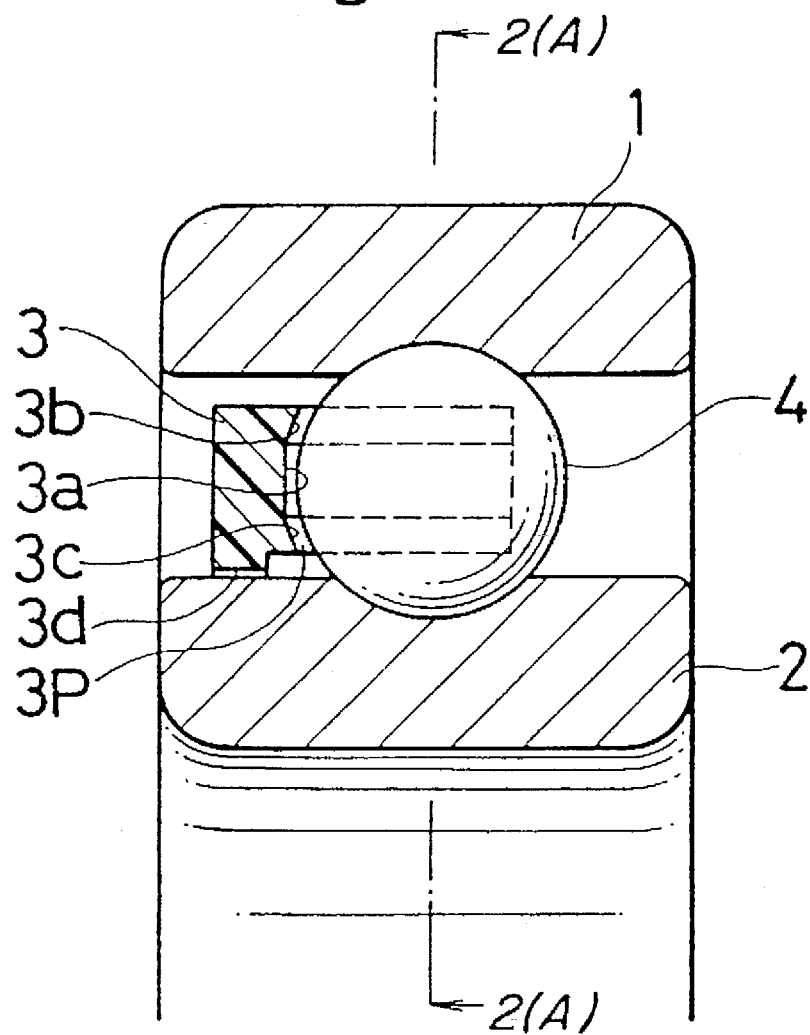

Fig.6(A)
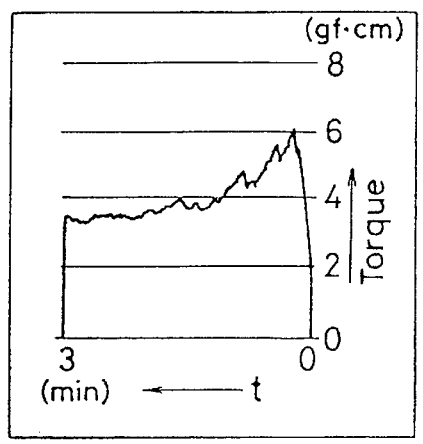
Fig.6(B)
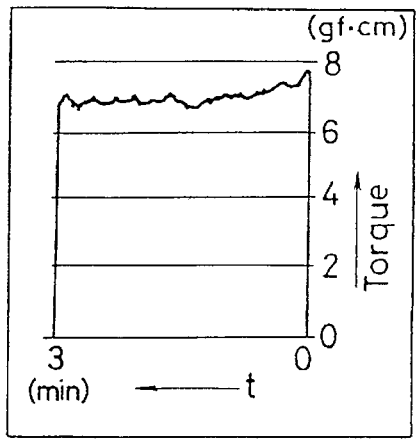
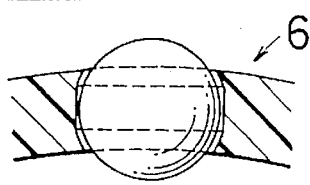
Cylindrical and spherical surface
Fig.6(A-I)
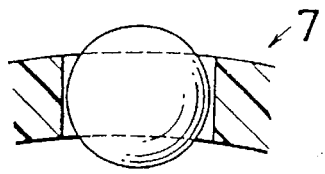
Cylindrical surface
Fig.6(B-I)
Fig.6(C)
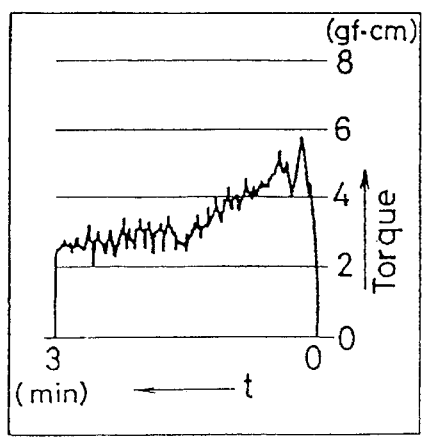
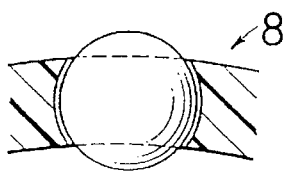
Spherical surface
Fig.6(C-I)

BEARING ASSEMBLY

BACKGROUND OF THE INVENTION

The present invention relates to a ball bearing assembly with a bearing ring guide type ball retainer. More particularly, this invention relates to a ball bearing assembly having a bearing ring guide type ball retainer with ball pockets shaped to optimize the amount of lubricant retained within the ball pockets.

Small diameter ball bearings are typically used in applications such as rotatably supporting a motor drive shaft in hard disk or floppy disk drives for conventional personal computers or word processors. Conventional small diameter ball bearings are often provided with molded plastic ball retainers, in which the ball retainers are either of the bearing ring guide type, or of the ball guide type. A bearing ring guide type ball retainer is guided by either the inner or outer races of the bearing, and a ball guide type ball retainer is guided primarily by the balls themselves. With either of the conventional ball retainers, it is common for the frictional torque of the bearing assembly during operation to gradually decrease from an initial relatively high value, until the frictional torque becomes substantially stabilized. The ball pockets for receiving each ball in a conventional ball retainer are illustrated in FIGS. 7-10. In FIGS. 7 and 8, a conventional bearing ring guide type ball retainer is illustrated, showing a conventional cylindrical inner wall for the ball pocket of the ball retainer. In FIGS. 9 and 10, a conventional ball guide type ball retainer is illustrated, showing a conventional spherical inner wall for the ball pocket. Lubrication problems commonly exist for ball bearing assemblies in which the balls are retained within the pockets of conventional ball retainers. For instance, with a conventional bearing ring guide type ball retainer having a cylindrical inner wall for each pocket, excessive lubricant often builds up within the ball pockets since the shape of the inner wall does not allow for the lubricant to be scraped off of the ball surfaces during operation.

With conventional ball guide type ball retainers, excessive lubricant adhering to a surface of a ball is scraped off at the edge portions of the spherical inner wall of each pocket. The excessive lubricant then adheres to the inner or outer peripheral wall surfaces of the ball guide type ball retainer without affecting torque. However, with conventional ball guide type ball retainers having ball pockets with spherical inner walls, fast rotation of the bearing assembly can result in too much lubricant being scraped from the ball surfaces, with the resultant generation of abnormal noise caused by improper lubrication.

SUMMARY OF THE INVENTION

An object of the present invention is to provide a ball bearing assembly in which the frictional torque generated by the ball bearing assembly is stabilized at a certain desirable value as a result of optimizing the amount of lubricant retained within the ball pockets of the ball retainer. A further object of the present invention is to provide a ball bearing assembly having a molded plastic ball retainer in which abnormal noise will not be generated during operation of the ball bearing assembly.

In a first embodiment of the present invention, a bearing ring guide type ball retainer is provided with ball pockets having an inner surface that is divided into a central cylindrical portion and two outer portions that are spherical in configuration. The spherical outer portions of the inner wall of the ball pocket allow for the maintenance of a slight clearance between the balls and the edges of the ball pockets, such that when the ball retainer is deflected as a result of clearance between the ball retainer and inner and outer races of the ball bearing, sufficient lubricant remains between the ball pockets and the balls. When operating a ball bearing assembly having a ball retainer with the above described inventive inner pocket wall, frictional torque generated by the ball bearing gradually lowers from an initial value to a desired stable level over a period of time.

BRIEF DESCRIPTION OF THE DRAWINGS

FIG. 1 is a side elevation view in partial cross section of an embodiment of the present invention showing a bearing ring guide type ball retainer.

FIG. 6(A) is a chart showing the frictional torque generated over a period of time by a ball bearing assembly having a ball retainer as shown below the chart.

FIG. 6(B) is a chart showing the frictional torque generated over a period of time by a ball bearing assembly having a ball retainer as shown below the chart.

FIG. 6(C) is a chart showing the frictional torque generated over a period of time by a ball bearing assembly having a ball retainer as shown below the chart.

DETAILED DESCRIPTION OF THE PREFERRED EMBODIMENTS

Figure 2A:
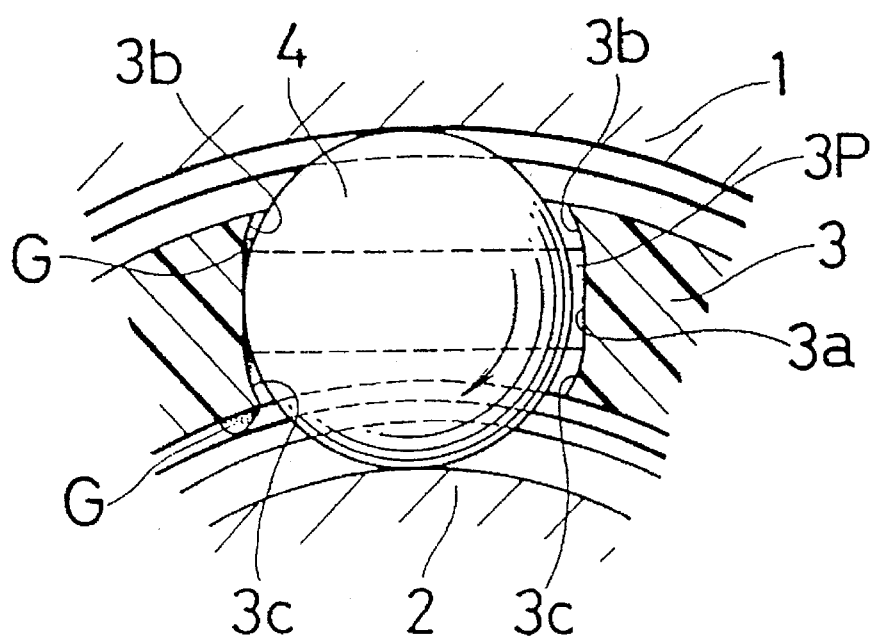
FIG. 2(A) is a cross sectional view taken in the direction of arrows 2(A)—2(A) in FIG. 1.

As shown in FIG. 1, a ball bearing according to an embodiment of the present invention comprises an outer ring or race 1, an inner ring or race 2, a plastic molded ball retainer 3, and a ball 4. The ball retainer 3 is of the inner ring guide type, wherein ball retainer 3 is guided by inner ring 2 via a retainer guide portion 3d. Alternatively, ball retainer 3 could be of an outer ring guide type, wherein ball retainer 3 would be provided with a guide portion that would extend in a radially outward direction toward outer ring 1.

Figure 2B:
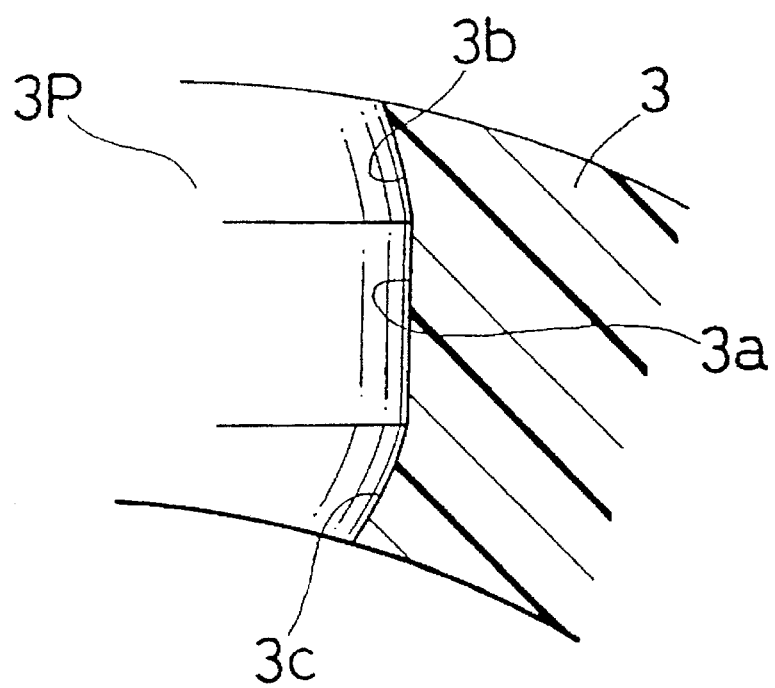
FIG. 2(B) is an enlarged cross sectional view of a portion of the ball retainer illustrated in FIG. 2(A).

As shown in FIG. 2(B), which illustrates an enlarged view of a portion of pocket 3P of ball retainer 3 shown in FIG. 2(A), the inner wall of pocket 3P of the ball retainer is shown in detail. The inner wall of pocket 3P comprises three portions: a cylindrical center portion 3a, an externai portion 3b, and an internal portion 3c. External and internal portions 3b and 3c, respectively, are designed preferably with a spherical configuration. Alternatively, external portion 3b and internal portion 3c of pocket 3P may be designed with circular conical surfaces. Central cylindrical portion 3a transitions smoothly into external and internal portions 3b and 3c, with the diameter of central cylindrical portion 3a being smaller than the diameters of the external and internal portions 3b and 3c. Since the diameter of central cylindrical portion 3a corresponds closely to the outer diameter of ball 4, the external and internal portions 3b and 3c of pocket 3P are provided with diameters that are enough larger than the diameter of ball 4 to ensure a clearance between the edges of pocket 3P and ball 4 at all times.

A further alternative embodiment of ball retainer 3 comprises one of external portion 3b or internal portion 3c having a spherical configuration, with the other of external portion 3b or internal portion 3c having a cylindrical configuration extended from central cylindrical portion 3a of the inner wall of pocket 3P.

Figure 3:
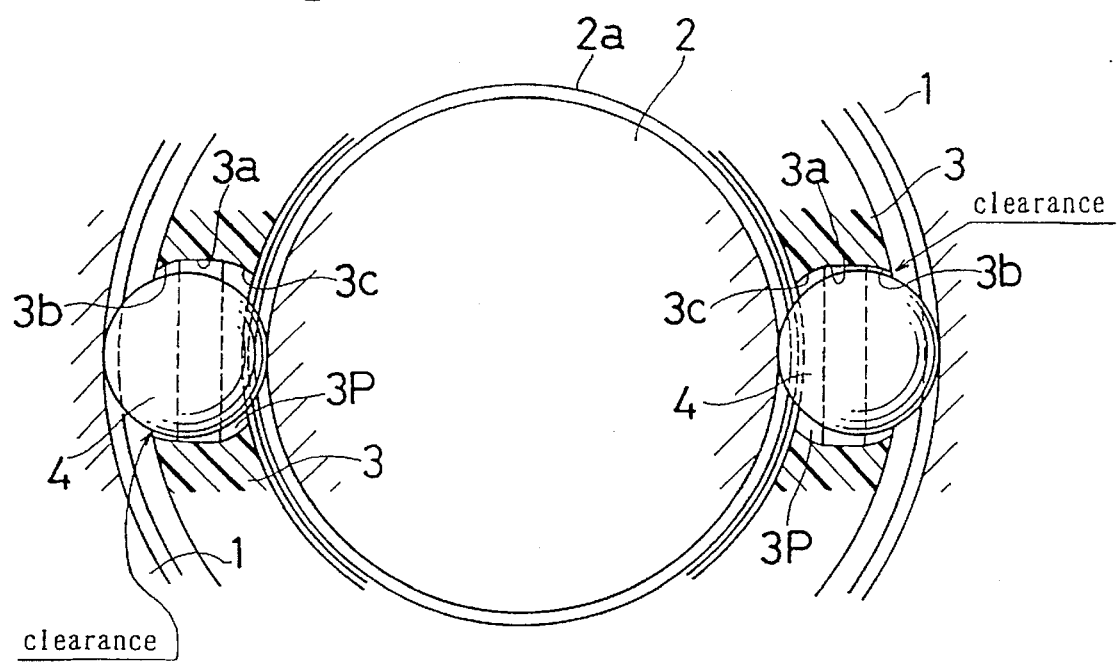
FIG. 3 is an elevational view in partial cross section showing the ball retainer of an embodiment of the present invention with two diametrically opposed balls in ball pockets of the retainer and the ball retainer being supported between the inner and outer races of the ball bearing assembly.

With a ball bearing assembly having an inner ring guide type retainer, as shown in FIG. 3, ball retainer 3 is rotated by a frictional force generated at the contact between inner ring 2 and retainer guide portion 3d of ball retainer 3. Ball 4 is brought into contact with the external portion 3b of the inner wall of pocket 3P as a result of deflection of ball retainer 3. As explained above, the diameters of the external and internal spherical configurations of the inner wall of pocket 3P ensures the maintenance of a clearance between the ball 4 and external and internal portions 3b and 3c of pocket 3P.

Figure 4A:
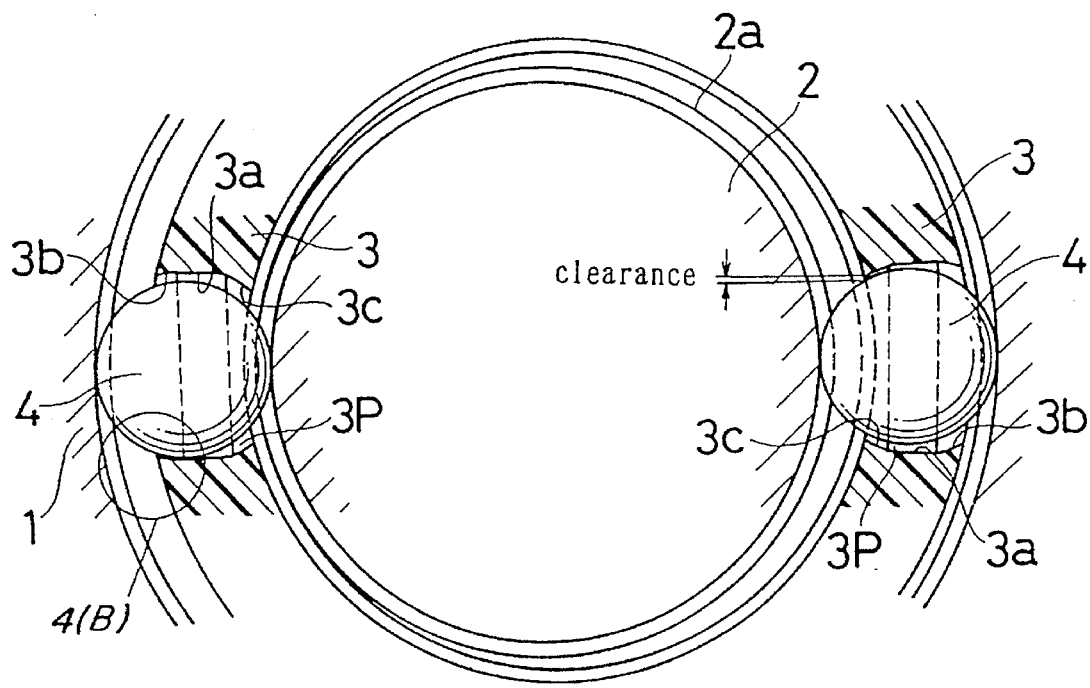
FIG. 4(A) is a view similar to that shown in FIG. 3, with the ball retainer being displaced relative to the bearing races of the bearing assembly.
Figure 4B:
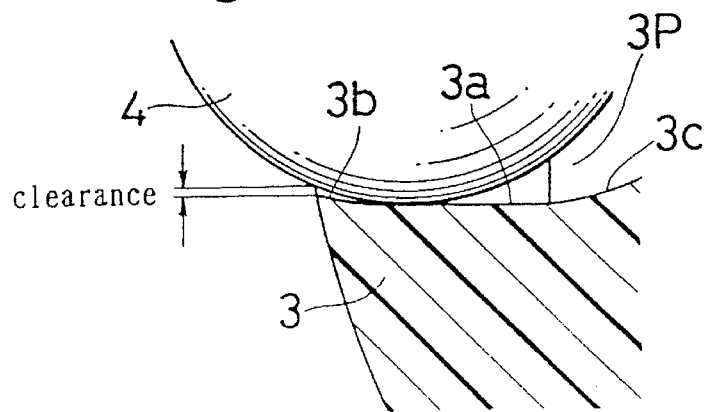
FIG. 4(B) is an enlarged view of a portion of FIG. 4(A) showing the relationship between a ball and the ball retainer when the ball retainer is displaced relative to the bearing races of the bearing assembly.

FIG. 4(A) illustrates the position of balls 4 relative to ball retainer 3 of the inner ring guide type, when ball retainer 3 has been deflected within the ball bearing assembly by an amount equal to the clearance between ball retainer 3 and inner ring 2. FIG. 4(B) is an enlarged view of a portion of FIG. 4(A).

More specifically, as shown in FIGS. 4(A) and 4(B), external portion 3b and internal portion 3c are provided with either a spherical configuration or a circular conical configuration having a diameter that is greater than the diameter of the central cylindrical portion 3a of pocket 3P. The larger diameter configuration of external portion 3b and internal portion 3c ensures that there will always be a clearance between ball 4 and edge portions of pocket 3P, even when ball retainer 3 is deflected within the ball bearing assembly by an amount corresponding to the radial gap between ball retainer 3 and a shoulder portion 2a of inner ring 2.

As described above, a preferred embodiment of the present invention comprises the inner wall of pocket 3P of ball retainer 3 having a central cylindrical portion 3a that transitions smoothly into an external portion 3b and an internal portion 3c. External portions 3b and internal portions 3c are each provided with a spherical configuration or a circular conical configuration having a diameter that is larger than the diameter of associated center cylindrical portion 3a. This specific configuration of pocket 3P ensures that a slight clearance will always remain between ball 4 and the internal and external edge portions of pocket 3P, even when ball retainer 3 is deflected relative to the inner and outer rings or races of the ball bearing. As a consequence, the amount of lubricant G remaining within the pocket 3P is optimized during operation of the ball bearing assembly. When compared to a conventional ball retainer having a conventional cylindrical pocket, the amount of lubricant G remaining in pocket 3P of ball retainer 3 is less in a ball bearing assembly having the ball retainer of the present invention than the amount of lubricant remaining in a conventional retainer with a conventional cylindrical pocket. When compared to a conventional ball retainer having a conventional spherical pocket, more lubricant G remains in pocket 3P for a ball bearing assembly having the ball retainer of the present invention than for a conventional ball retainer having a conventional spherical pocket.

When initially operating a ball bearing assembly having a ball retainer of the present invention, substantial frictional torque is generated by the lubricant within pocket 3P of retainer 3. However, the frictional torque soon lowers to a desired stable level.

Figure 7:
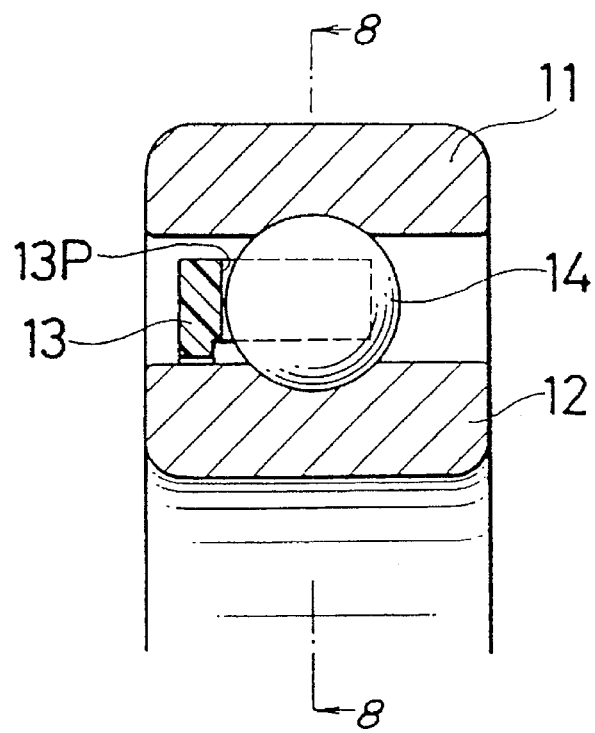
FIG. 7 is a side elevation view in partial cross section of a conventional ball bearing assembly having a ball retainer with cylindrical ball pockets.
Figure 8:
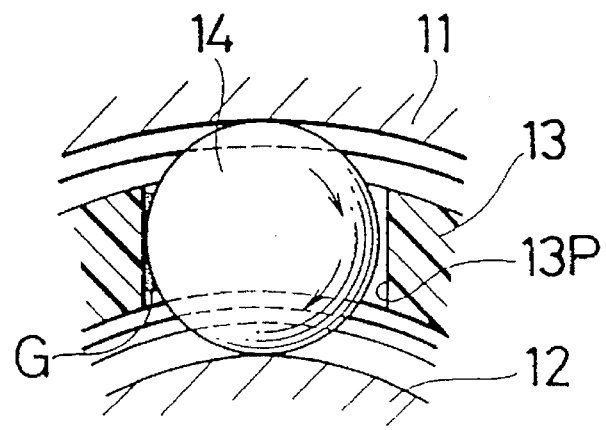
FIG. 8 is an elevational view in partial cross section taken in the direction of arrows 8—8 in FIG. 7.
Figure 9:
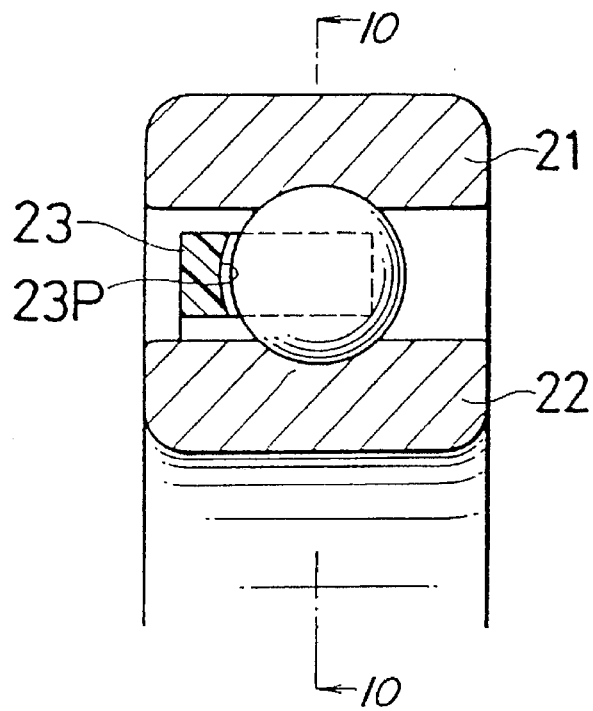
FIG. 9 is a side elevational view in partial cross section of a conventional ball bearing assembly having a ball guide type ball retainer with spherical pockets.
Figure 10:
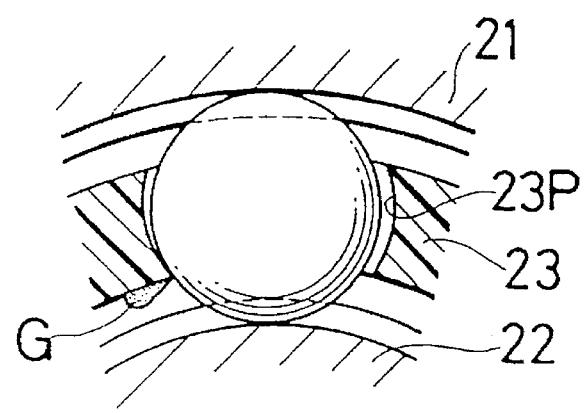
FIG. 10 is an elevational view in partial cross section taken in the direction of arrows 10—10 in FIG. 9.

Experimental measurements have been made of the rotational frictional torque generated in a ball bearing assembly having a ball retainer of the present invention as compared to the frictional torque generated by a conventional ball bearing assembly having a conventional ball retainer. The experiments have been conducted using ball bearing assemblies having either a ball retainer of the present invention, as shown in FIGS. 1 and 2, a conventional ball retainer having a cylindrical pocket, as shown in FIGS. 7 and 8, or a conventional ball retainer having a spherical pocket as shown in FIGS. 9 and 10.

Figure 5A:
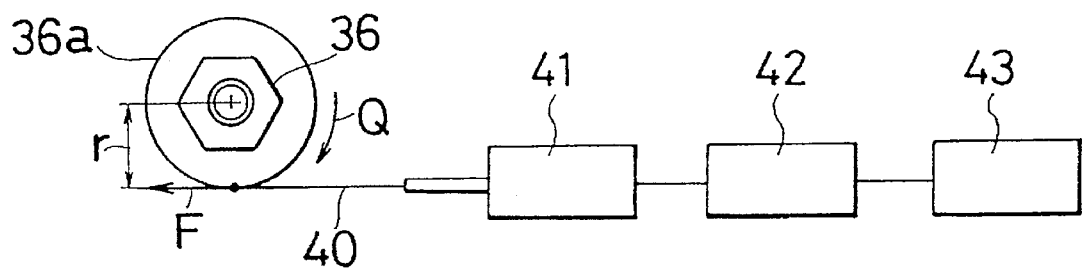
FIG. 5(A) is a plan view of a device for measuring the frictional torque of a ball bearing assembly of the present invention.
Figure 5B:
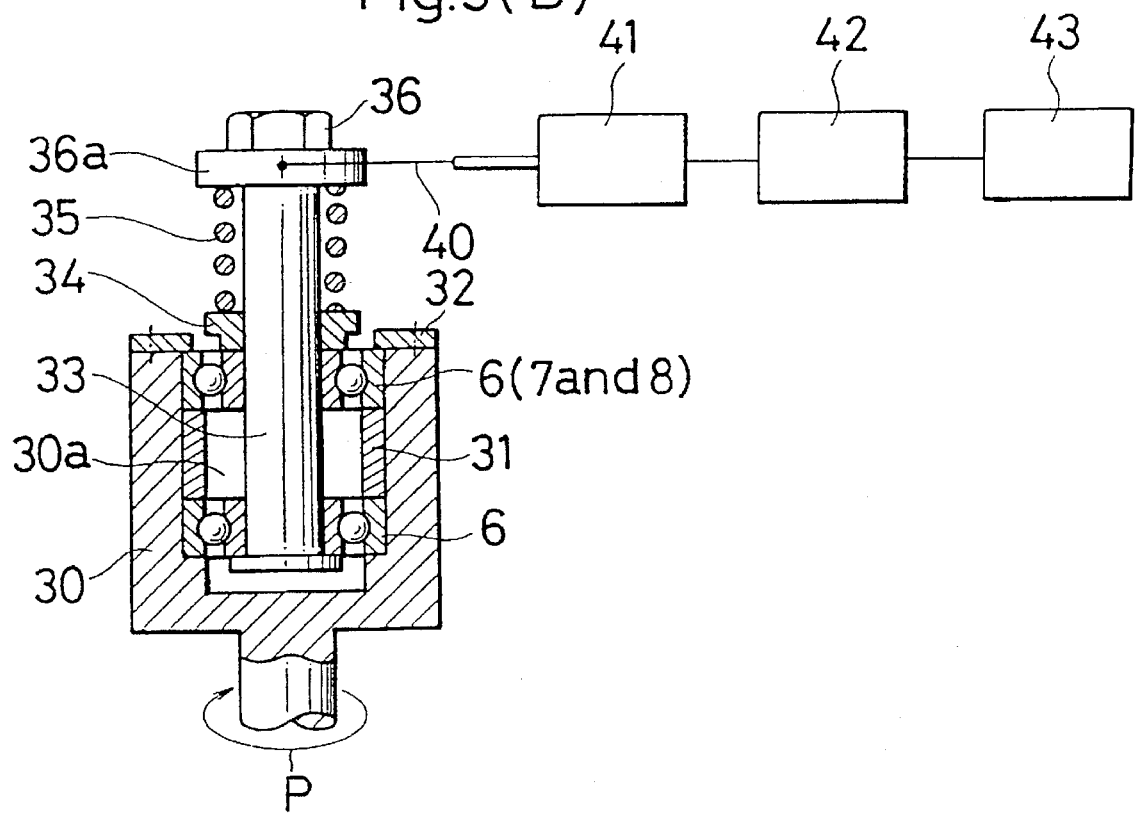
FIG. 5(B) is a side elevational view in partial cross section of the device shown in FIG. 5(A).

Referring to FIG. 5(A) and FIG. 5(B), the experimental apparatus is shown, wherein reference numeral 30 designates a rotary housing, and two axially spaced ball bearings are mounted within a central opening in housing 30. A ball bearing assembly having a ball retainer of the present invention is designated by the reference numeral 6; a conventional ball bearing having a conventional ball retainer with cylindrical ball pockets is designated by the numeral 7; and a conventional ball bearing having a conventional retainer with spherical ball pockets is designated by the numeral 8. A spacer 31 separates the two axially spaced ball bearings within housing 30. The ball bearing positioned at the lower portion of the opening in rotary housing 30 is supported by a shoulder in rotary housing 30. The ball bearing positioned in the upper portion of the opening in rotary housing 30 is secured in place by a ring 32. A shaft 33 is mounted within the internal ring of both of the ball bearings mounted in rotary housing 30. An axial preload is provided on the upper bearing within rotary housing 30 by a spring 35 and spring supporter 34 mounted around shaft 33 and pressing against the inner ring of the upper ball bearing in housing 30. A collar member 36a and flange nut 36 are screwed onto the upper end of shaft 33 and retain spring 35 as shown in FIG. 5(B).

A steel wire 40 is linked with a dynamic strain meter 41 and is fixed to the outer circumferential surface of collar member 36a, as shown in FIG. 5(A). Any slight strain experienced by wire 40 is detected by dynamic strain meter 41, amplified by amplifier 42, and recorded by a recorder 43.

When rotary housing is rotated in the direction of arrow P, as shown in FIG. 5(B), shaft 33 is also driven to rotate in the direction of arrow Q shown in FIG. 5(A) as a result of the frictional torque generated by the bearings mounted within the housing 30. The frictional torque results in a tangential force F, as shown in FIG. 5(A), exerted on the outer circumferential surface of collar member 36a. If the radial distance from the center of shaft 33 to the outer circumferential surface of collar member 36a is r, as shown in FIG. 5(A), then the frictional torque T can be calculated from the equation T=F×r. FIGS. 6(A), 6(B) and 6(C) represent three charts showing the results of measuring the frictional torque generated by the three ball bearing assemblies 6, 7 and 8. The common parameters for all three ball bearing assemblies are as follows:

inner diameter of inner ring =5 mm, outer diameter of outer ring =13 mm, width of inner/outer ring =4 mm, diameter of pitch circle =9 mm, ball diameter =2 mm, number of balls =8.

(The chart shown in FIG. 6(A) represents the test results obtained with the ball bearing 6 of the present invention.) At the initial rotation of housing 30, the frictional torque was measured to be 6$g_f$cm. Three minutes after the start of rotation of housing 30, the frictional torque had stabilized at approximately 3.5$g_f$cm.

FIG. 6(B) illustrates a chart showing the results of tests executed using a conventional ball bearing 7 having a ball retainer with a conventional cylindrical pocket. The frictional torque generated at the start of rotation of housing 30 was measured to be 7.8 $g_f$cm. Three minutes after the initial rotation of housing 30, the frictional torque had stabilized at approximately 7$g_f$cm.

FIG. 6(C) illustrates a chart showing the results of tests executed with a conventional ball bearing 8 having a ball retainer with a conventional spherical pocket. The frictional torque measured at the initial start up of rotation of housing 30 was measured to be 5.8$g_f$cm. After three minutes from the start up of rotation, frictional torque had stabilized at approximately 2.8 $g_f$cm.

As is apparent from observing the test results, the frictional torque generated by a ball bearing having a conventional ball retainer with a conventional cylindrical pocket does not substantially lower from its initial value, whereas the frictional torque generated by a ball bearing having a conventional ball retainer with a conventional spherical pocket stabilizes at a value that is significantly lower from the initial frictional torque value.

When a ball bearing having a ball retainer of the present invention is tested, the frictional torque generated by the ball bearing drops from the initial torque value, but stabilizes at a value higher than the stabilized value for a conventional ball retainer with a conventional spherical pocket. The higher stabilized frictional torque of a ball bearing having a ball retainer of the present invention is a result of the maintenance of a desired amount of lubricant within pocket 3P of the ball retainer of the present invention. The maintenance of an optimal level of lubricant within pocket 3P for a ball retainer of the present invention ensures that abnormal noise will not be created by the ball retainer as a result of improper lubrication during high speed rotation.

What is claimed is:

1. A ball bearing assembly comprising:

an inner ring;

an outer ring;

a plurality of balls disposed between said inner and outer rings;

an annular ball retainer mounted between said inner and outer rings with a portion of said annular retainer forming a radially extending shoulder for guiding said annular retainer relative to one of said inner ring or said outer ring;

said annular retainer defining a plurality of pockets for supporting said balls in spaced relationship, with each of said pockets having a central cylindrical portion and inner and outer portions with spherical configurations such that said central cylindrical portion transitions smoothly into said inner and outer portions and such that the diameter of said central cylindrical portion is smaller than the diameters of the inner and outer portions so that a clearance is always maintained between said inner and outer portions of said pockets and associated balls when said ball retainer is deflected relative to said inner and outer rings.

* * * * *